Nov. 21, 1950     A. H. NELSON, JR     2,530,900

CHILD'S SEAT

Filed Jan. 29, 1946

ALBERT H. NELSON, JR.
INVENTOR

BY *Hubert Miller*
ATTORNEY

Patented Nov. 21, 1950

2,530,900

UNITED STATES PATENT OFFICE 2,530,900

CHILD'S SEAT

Albert H. Nelson, Jr., Wichita, Kans.

Application January 29, 1946, Serial No. 644,057

2 Claims. (Cl. 155—79)

This invention relates to a child's seat which is particularly adapted for quick installation on and removal from the seat back of an automobile.

Previous seats of this type, due to their design, have suspended the child's seat bottom at a relatively low level in the car, a position from which the child is either unable or barely able to see out of the car windows.

It is therefore the primary object of this invention to provide a child's seat which is so designed as to seat the child at a relatively high level in the car so that he may see out of the car windows fully as well as the other occupants of the car.

Further objects are to provide a seat structure which is collapsible for commercial packing, shipment, and storage; which with slight modification may be installed on seat backs of varying thickness and shape; which is of simple design, is relatively inexpensive to manufacture, is exceptionally strong and sturdy, yet light in weight.

Figure 1:
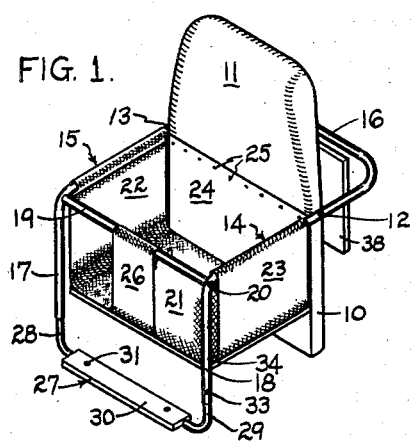
Figure 1 is a three quarter front isometric view of a child's seat made in accordance with the invention.
Figure 2:
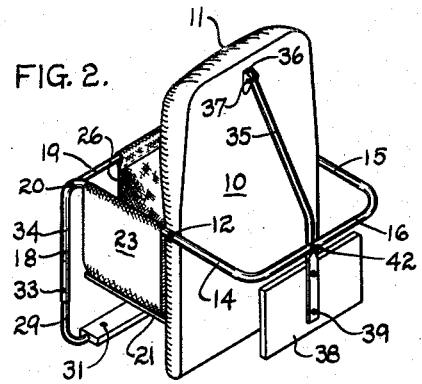
Figure 2 is a three quarter rear view of the same seat.

Referring particularly to Figures 1 and 2, it will be seen that the illustrated embodiment of the invention includes a rigid back rest 10, at least the upper portion of which is upholstered, as at 11. This back rest 10 is pivotally mounted at 12 and 13 between arms 14 and 15 of a substantially horizontal U-shape rigid frame, the base portion of which is designated by the numeral 16. This frame may be made of thin gage aluminum tubing, as shown, or of any other suitable material. The two ends of this U-shaped frame are downturned, as shown, and are designated by the numerals 17 and 18. At or near the point shown, the arms 14 and 15 are rigidly spaced apart by a brace 19, the opposite ends of which may be secured to the arms by screws 20. This brace also serves as a guard rail to prevent the child from falling or being thrown forward out of the seat.

The seat proper is made up of a stiffened upholstered seat bottom 21 suspended from the arms 14 and 15 by integral cloth or canvas side members 22 and 23, and by an integral or attached cloth or canvas back member 24. The cloth back member 24 is suitably attached to the seat back 10, as by upholstery tacks 25. A guard strap 26 is suitably attached to the brace 19, as by a sewed loop and to the front edge of the seat bottom 21, as shown, and serves to prevent the infant from slipping downward out of the seat.

Figure 6:
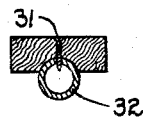
Figure 6 is a sectional view taken through the footrest illustrating the manner of securing the foot plate on its supporting frame.

An adjustable foot rest 27 is made up of a substantially U-shape frame, the ends 28 and 29 of which slip into the two ends 17 and 18 of the main frame. The base member 32 of the foot rest frame carries a foot plate 30, held in position by screws 31, as shown in detail in Figure 6. The foot rest is adjustable upward or downward by removal of holding screws 33, manual adjustment of the foot rest, and replacement of the screws in selected spaced perforations 34 in each of the frame ends 17 and 18. The screws seat in registering spaced perforations in the frame ends 28 and 29.

Figure 3:
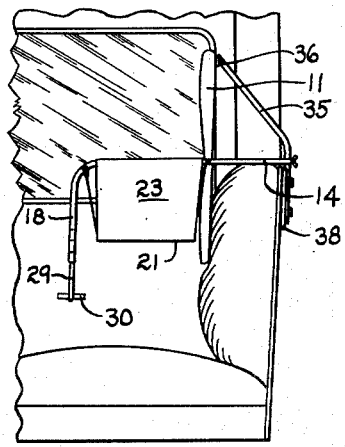
Figure 3 is a side view of the same seat shown installed on the seat back of an automobile, pertinent parts of the automobile being shown fragmentarily.
Figure 4:
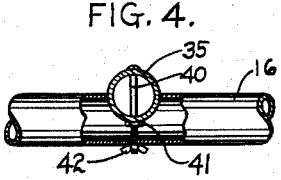
Figures 4 and 5 are fragmentary views with parts in section showing certain details in the construction of the seat illustrated.
Figure 5:
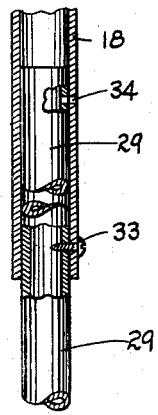

As a means of supporting the entire seat from the seat back of an automobile seat, I provide a brace member 35, the upper end of which is pivotally mounted near the central upper end of the back rest 10, as by means of a bracket 36 and pivot pin 37 (see Figures 2 and 3). Intermediate its ends this brace is bent slightly, as shown, so that its lower end lies substantially parallel to the back rest 10. Its lower end portion rigidly carries a flat plate 38, held in position by means of screws, rivets, or bolts 39, the plate being positioned substantially parallel to the back rest 10. Just above the plate 38, the brace member 35 is removably but rigidly connected to the frame member 16 in any suitable manner. One means of making this connection is shown in detail in Figure 4, wherein a bolt 40 is passed through the brace 35 and held in position by a nut 41. The extended end of this bolt then passes through the frame member 16, and is held therein by a wing nut 42.

With the brace 35 secured in position as shown and described, a rigid structure is formed, the back rest 10 being held rigid with relation to its supporting frame. Likewise the plate 38 is held rigid with relation to the frame and the back rest. With the seat as a whole in this condition, it may be slipped over the back of an automobile seat, as shown in Figure 3, or over the back of a divan or upholstered chair in the home. The lower portion of the back rest 10 and the plate 38 firmly embrace the seat back of the automobile seat between them, and the seat proper is thus capable of safely supporting a child's weight.

Particular attention is called to the fact that the seat bottom 21 is supported in a relatively high position with relation to the seat bottom of the car seat to which it may be attached. This arrangement elevates the child's position in the automobile, making it possible for him to look out of the car windows equally as well as an adult sitting in the car seat. This aids materially in keeping the child pacified by permitting outside objects to hold his attention.

For storing the seat in a minimum of space, or for packing the seat for commercial shipment, it is only necessary to remove the wing nut 42 releasing the brace 35 from the frame member 16. The seat back then pivots and the entire structure can be folded to a materially reduced size.

For use by larger children the guard strap as well as the brace member 19 may be removed, if desired, the rigidity of the entire frame being maintained by the foot rest frame.

While the major portion of this particular embodiment of the invention has been illustrated as being made of tubing, the invention is not limited to this construction. From the description it will be apparent that the invention can be produced from other inexpensive yet light weight materials which will provide a strong durable structure. Of major importance is the construction which permits the seat to be positioned at a relatively high level with relation to the car seat, chair, or divan to which it is attached. Such changes or variations in construction as may fall within the terms of the appended claims are to be considered a part of this invention.

Having described the invention, I claim:

1. A child's seat comprising: a frame; a seat and a back rest panel supported by the frame intermediate its ends, the panel extending above and below said frame; a brace member connected at spaced points to the back rest and to the frame aft of the back rest, a portion of it extending below the frame; a plate member rigidly carried by the last mentioned portion of said brace member in a plane spaced from and substantially parallel to that portion of the back rest below said frame, said plate, said frame, and that portion of the back rest below said frame being adapted to cooperate to embrace an independent stable object for supporting the child's seat at a relatively high level with relation to the upper end of said object.

2. A child's seat comprising: a frame; a rigid back rest pivotally supported by the frame intermediate its ends, the back rest extending above and below said frame; a seat bottom suspended from the frame forward of and in proximity to said back rest; a brace member having one of its ends pivotally connected to the rear surface of said back rest and having an intermediate portion removably connected to said frame at a point spaced rearward from the point of pivotal connection and from said back rest; a plate carried rigidly on the free end of said brace member in a plane substantially parallel to the lower portion of said back rest; said plate, said frame, and the lower portion of said back rest being adapted to cooperate to embrace an independent fixed object in such manner as to maintain said frame in a substantially horizontal position on a level at least as high as the upper end of said object.

ALBERT H. NELSON, Jr.

REFERENCES CITED

The following references are of record in the file of this patent:

UNITED STATES PATENTS

| Number | Name | Date |
|---|---|---|
| 1,887,810 | Hughes | Nov. 15, 1932 |
| 2,349,092 | Hammer | May 16, 1944 |

FOREIGN PATENTS

| Number | Country | Date |
|---|---|---|
| 567,141 | Germany | Dec. 30, 1932 |